US012590001B2

(12) United States Patent
Karam et al.

(10) Patent No.: US 12,590,001 B2
(45) Date of Patent: Mar. 31, 2026

(54) METHOD FOR PRODUCING SUPERHYDROPHOBIC CARBON NANOTUBE SHEETS

(71) Applicant: Technology Innovation Institute—Sole Proprietorship LLC, Masdar City (AE)

(72) Inventors: Zainab Karam, Masdar City (AE); Sunil Lonkar, Masdar City (AE); Juveiriah M. Ashraf, Masdar City (AE); Myriam Ghodhbane, Masdar City (AE); Chiara Busa, Masdar City (AE); Vincenzo Giannini, Masdar City (AE)

(73) Assignee: Technology Innovation Institute—Sole Proprietorship LLC, Masdar City (AE)

( * ) Notice: Subject to any disclaimer, the term of this patent is extended or adjusted under 35 U.S.C. 154(b) by 350 days.

(21) Appl. No.: 18/347,124

(22) Filed: Jul. 5, 2023

(65) Prior Publication Data

US 2024/0010498 A1     Jan. 11, 2024

Related U.S. Application Data

(60) Provisional application No. 63/367,756, filed on Jul. 6, 2022.

(51) Int. Cl.
*C01B 32/174* (2017.01)

(52) U.S. Cl.
CPC ........ *C01B 32/174* (2017.08); *C01B 2202/28* (2013.01); *C01P 2004/03* (2013.01)

(58) Field of Classification Search
CPC . C01B 32/174; C01B 2202/28; C01P 2004/03
See application file for complete search history.

(56) References Cited

U.S. PATENT DOCUMENTS

| | | | |
|---|---|---|---|
| 9,809,457 B2 | 11/2017 | Hata et al. | |
| 10,494,262 B2 | 12/2019 | Hata et al. | |

(Continued)

FOREIGN PATENT DOCUMENTS

| | | |
|---|---|---|
| CN | 106477548 | 3/2017 |
| CN | 113322048 | 8/2021 |

(Continued)

OTHER PUBLICATIONS

International Search Report and Written Opinion for International Application No. PCT/IB2023/056986, mailed Nov. 8, 2023, 08 Pages.

(Continued)

*Primary Examiner* — Jamel M Nelson
*Assistant Examiner* — Erica Hartsell Funk
(74) *Attorney, Agent, or Firm* — DLA Piper LLP (US)

(57) ABSTRACT

The present disclosure describes methods of producing superhydrophobic carbon nanotube sheets. The methods disclosed herein allow the rapid and scalable production of superhydrophobic carbon nanotube sheets that may remain on a substrate, or they may be removed from the substrate to produce freestanding superhydrophobic carbon nanotube sheets. The carbon nanotube sheets produced by the present methods were confirmed to be superhydrophobic by water droplet contact angle.

13 Claims, 9 Drawing Sheets

(56)        References Cited

U.S. PATENT DOCUMENTS

| | | |
|---|---|---|
| 11,453,591 B2 | 9/2022 | Gihm et al. |
| 2013/0337707 A1 | 12/2013 | Hata et al. |
| 2018/0016146 A1 | 1/2018 | Hata et al. |
| 2020/0172400 A1 | 6/2020 | Gihm et al. |

FOREIGN PATENT DOCUMENTS

| | | | | |
|---|---|---|---|---|
| EP | 2653444 | 10/2013 | | |
| JP | 2008-308582 | 12/2008 | | |
| WO | WO-2017033027 A1 * | 3/2017 | ............ | C01B 32/00 |
| WO | WO-2018224965 A1 * | 12/2018 | .......... | C01B 32/168 |
| WO | 2020111520 | 6/2020 | | |

OTHER PUBLICATIONS

Search Report for AE Application No. P6001699/2023, mailed May 22, 2024, 07 Pages.
Office Action and Search Report for United Arab Emirates Patent Application No. P6001699/2023, dated Jul. 17, 2025, 6 pages.

\* cited by examiner

300

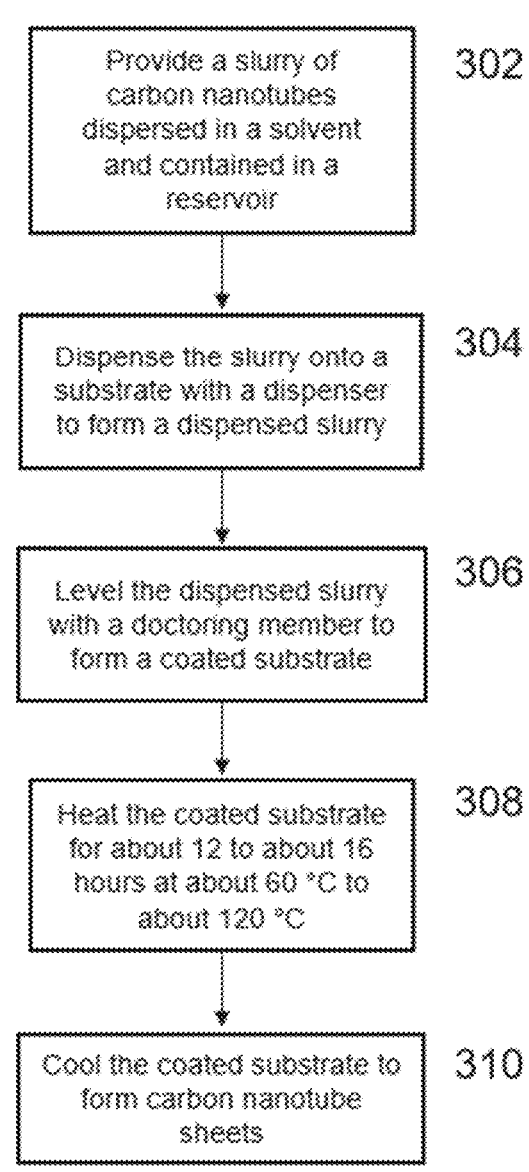

302

Provide a slurry of carbon nanotubes dispersed in a solvent and contained in a reservoir

304

Dispense the slurry onto a substrate with a dispenser to form a dispensed slurry

306

Level the dispensed slurry with a doctoring member to form a coated substrate

308

Heat the coated substrate for about 12 to about 16 hours at about 60 °C to about 120 °C

310

Cool the coated substrate to form carbon nanotube sheets

METHOD FOR PRODUCING SUPERHYDROPHOBIC CARBON NANOTUBE SHEETS

CROSS-REFERENCE TO RELATED APPLICATIONS

This application claims priority to U.S. Provisional Application No. 63/367,756, which was filed on Jul. 6, 2022, and is hereby incorporated by reference herein in its entirety.

FIELD

The present disclosure relates generally to methods of producing carbon nanotube sheets. More specifically, the present disclosure relates to methods of producing carbon nanotube sheets in a fast, inexpensive, and scalable manner that results in superhydrophobic sheets.

BACKGROUND

Carbon nanotubes have widespread utility in many fields, including air and water purification, energy storage, and wearable electronics. Carbon nanotubes may be synthesized via several routes known in the art such as laser ablation and chemical vapor deposition, and there have been numerous studies directed towards producing high-quality carbon nanotubes. Preparing sheets of carbon nanotubes allows the realization of yet more prospective applications, including fire-retardant personal protective equipment and antiviral barriers.

One such embodiment of carbon nanotube sheets is buckypaper, which is a thin sheet of carbon nanotubes that shows promise in next-generation electronics applications as well as high-strength body armor. The high strength of buckypaper coupled with its light weight, relative to materials exhibiting similar strength, along with heat dispersion and electrical conductivity properties, make it an attractive candidate for many areas of research and development.

There are several methods known to those skilled in the art to produce carbon nanotube sheets. One such method is membrane filtration, which requires expensive membranes, long filtration times, and produces sheets of relatively small dimensions. Chemical vapor deposition is also employed for carbon nanotube sheet production, which again requires a costly apparatus and results in sheets which are limited to the size of the deposition chamber. The present techniques available for producing carbon nanotube sheets require long processing times and high production costs, and there is significant difficulty implementing these techniques on larger scales. Recent improvements in the equipment for producing carbon nanotube sheets have allowed some variation in the size of sheets that may be produced and substrate which may be used, such as the apparatus described in U.S. Pat. No. 11,242,249 B2, the entirety of which is incorporated by reference herein. Despite these improvements, there remains a need for fast, scalable methods to produce high-quality carbon nanotube sheets on varied substrates or freestanding carbon nanotube sheets that are not fixed to a substrate.

SUMMARY

There is provided a method for producing carbon nanotube sheets, the method including: providing a slurry of a carbon nanotube material dispersed in a solvent and contained in a reservoir, dispensing the slurry of the carbon nanotube material onto a substrate with a dispenser which is connected to the reservoir to form a dispensed slurry, leveling the dispensed slurry with a doctoring member to form a coated substrate, heating the coated substrate for a time of about 12 hours to about 16 hours at a temperature of about 60° C. to about 120° C., and cooling the coated substrate to form a carbon nanotube sheet.

In some embodiments, the carbon nanotube material may include carbon nanotube powder, carbon nanotube flakes, carbon nanotube pellets, or combinations thereof. In some embodiments, the slurry according to any of the above embodiments may include about 0.01 wt. % to about 1 wt. % carbon nanotube material. In some embodiments, the slurry according to any of the above embodiments may include about 0.2 wt. % to about 0.7 wt. % carbon nanotube material.

In some embodiments, the solvent according to any of the above embodiments may include water, ethanol, acetone, dimethylformamide, tetrahydrofuran, dimethylacetamide, dimethyl sulfoxide, or combinations thereof. In some embodiments, the solvent according to any of the above embodiments may include water and acetone in a ratio of about 10:1 to about 100:1. In some embodiments, the solvent according to any of the above embodiments may include water and ethanol in a ratio of about 10:1 to about 100:1. In some embodiments, the solvent according to any of the above embodiments may include water and a mix of ethanol and acetone in a ratio of about 10:1 to about 100:1.

In some embodiments, the doctoring member according to any of the above embodiments is separated from the substrate by a distance of about 0.01 mm to about 2 mm. In some embodiments, the doctoring member according to any of the above embodiments is separated from the substrate by a distance of about 0.1 mm to about 0.7 mm. In some embodiments, the substrate according to any of the above embodiments may include a flexible or rigid metal, a metal alloy or metal oxide, a polymeric material, a glass, a glass-laminated polymer, a semiconductor, an insulator, or combinations thereof. In some embodiments, the substrate according to any of the above embodiments is at least about 0.1 m in length. In some embodiments, the substrate is at least about 1 m in length.

In some embodiments, the time according to any of the above embodiments is about 13 hours to about 15 hours. In some embodiments, the time according to any of the above embodiments is about 14 hours. In some embodiments, the temperature is about 80° C. to about 100° C. In some embodiments, the temperature according to any of the above embodiments is about 90° C.

In some embodiments, the carbon nanotube sheet according to any of the above embodiments remains on the substrate. In some embodiments, the method according to any of the above embodiments further includes the step of removing the carbon nanotube sheet from the substrate to form a freestanding carbon nanotube sheet. In some embodiments, the method according to any of the above embodiments further includes the step of removing the carbon nanotube sheet from the substrate and rolling the carbon nanotube sheet to form a rolled carbon nanotube sheet.

BRIEF DESCRIPTION OF THE DRAWINGS

Aspects, features, benefits, and advantages of the embodiments described herein will be apparent with regard to the following description, appended claims, and accompanying drawings where:

FIG. 3 is a flow chart of an exemplary method for making carbon nanotube sheets, which can include steps of providing a slurry of a carbon nanotube material dispersed in a solvent and contained in a reservoir, dispensing the slurry of the carbon nanotube material onto a substrate with a dispenser which is connected to the reservoir to form a dispensed slurry, leveling the dispensed slurry with a doctoring member to form a coated substrate, heating the coated substrate for a time of about 12 hours to about 16 hours at a temperature of about 60° C. to about 120° C., and cooling the coated substrate to form a carbon nanotube sheet.

FIG. 4A shows a carbon nanotube sheet on a glass substrate with a copper and silicon border, wherein the water droplet has a contact angle of 157.39°. FIG. 4B shows a carbon nanotube sheet on copper with a 5 mm gap on a glass substrate, wherein the water droplet has a contact angle of 156.67°.

FIG. 4C shows a carbon nanotube sheet on glass substrate with a copper and silicon border, wherein the water droplet has a contact angle of 155.54°.

DETAILED DESCRIPTION

Figure 1:
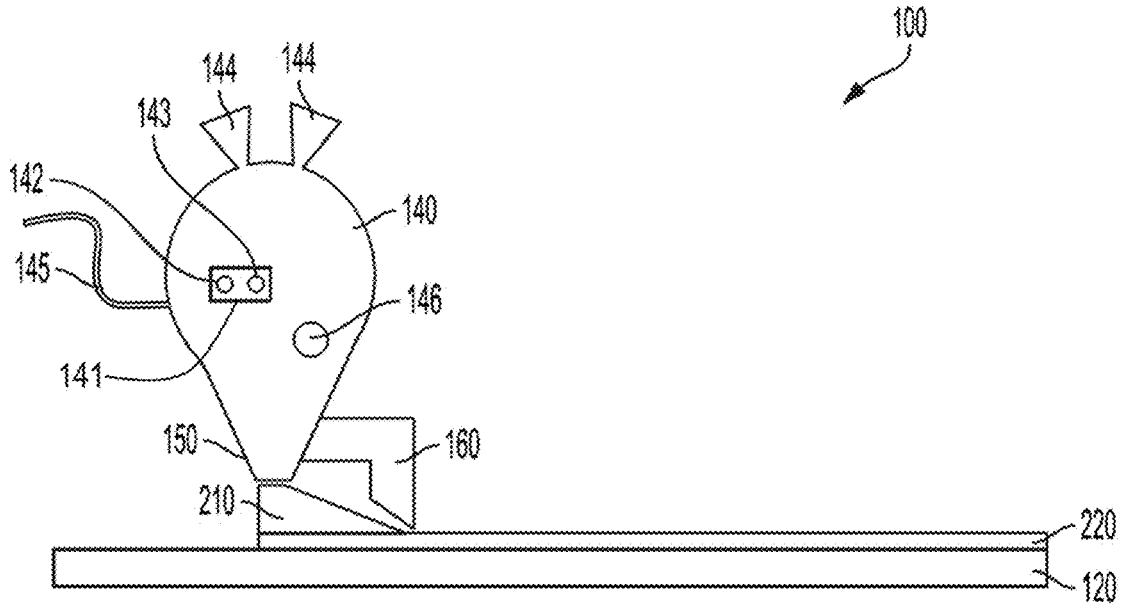
FIG. 1 shows an illustrative diagram of the apparatus and components used in the present disclosure to produce carbon nanotube sheets, wherein a slurry of carbon nanotubes is contained within a reservoir to be dispensed onto a substrate, with a doctoring member to level out the resulting deposited carbon nanotube slurry, according to an embodiment of the present disclosure.

According to some embodiments of the present disclosure, facile and scalable methods for preparing carbon nanotube sheets which may be freestanding, flexible, and foldable, are provided. The methods described herein may have several advantages over the prior art, including but not limited to low cost, fast processing times, the potential for high-throughput by utilizing roll-to-roll processing, and the ability to tune the length, thickness, density, and/or composition of the carbon nanotube sheets in order to produce sheets with superior properties.

Before describing the embodiments in detail, the following definitions are used throughout the present disclosure.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, the term "about" means plus or minus 10% of the numerical value of the number with which it is being used. For example, "about 50%" means in the range of 45-55% and also includes exactly 50%.

As used herein, the term "tape-casting" refers to a process wherein a slurry is cast onto a substrate and subsequently dried to form a coated substrate, optionally including additional processing steps.

As used herein, the term "doctor blading" refers to the process of using a doctoring member (which may be a doctor blade) to smooth or level a solution or slurry which has been deposited onto a substrate.

As used herein, the term "carbon nanotube(s)" refers to a tube of carbon having a diameter typically measured in nanometers, and may comprise single-wall carbon nanotubes (SWCNTs) or multi-walled carbon nanotubes (MWCNTs). The length, diameter, and number of walls of the tubes is not particularly limited.

As used herein, the term "carbon nanotube sheets" refers to sheets of carbon nanotubes that have been cast onto a substrate to form a thin layer and which remain on the substrate as a coating, or carbon nanotube sheets which have been removed from a substrate to be freestanding.

As used herein, the term "dispersion agent" refers to any additive that improves the dispersibility of carbon nanotubes in a solvent. Carbon nanotubes have poor dispersibility in solvents such as water due to strong intermolecular interactions, thus hindering the industrial-scale processing of carbon nanotubes. Water is desirable as a processing solvent over organic solvents, which may be volatile and/or carcinogenic. Functionalizing the surface of carbon nanotubes may improve the dispersibility of the carbon nanotubes, though such functionalization may impact the resulting properties. As such, methods to produce carbon nanotubes may include the use of surfactants such as sodium lauryl sulfate, Triton X-100, Tween-20, Tween-80, SDS, DOSS, or similar compounds to improve the dispersibility of the carbon nanotubes in a solvent.

As used herein, the term "superhydrophobic" refers to surfaces, compounds, materials, or other objects that are difficult to wet. More specifically, superhydrophobicity or a superhydrophobic material may be defined such that a water droplet on the surface of said superhydrophobic material has a contact angle greater than 150°.

Figure 2:
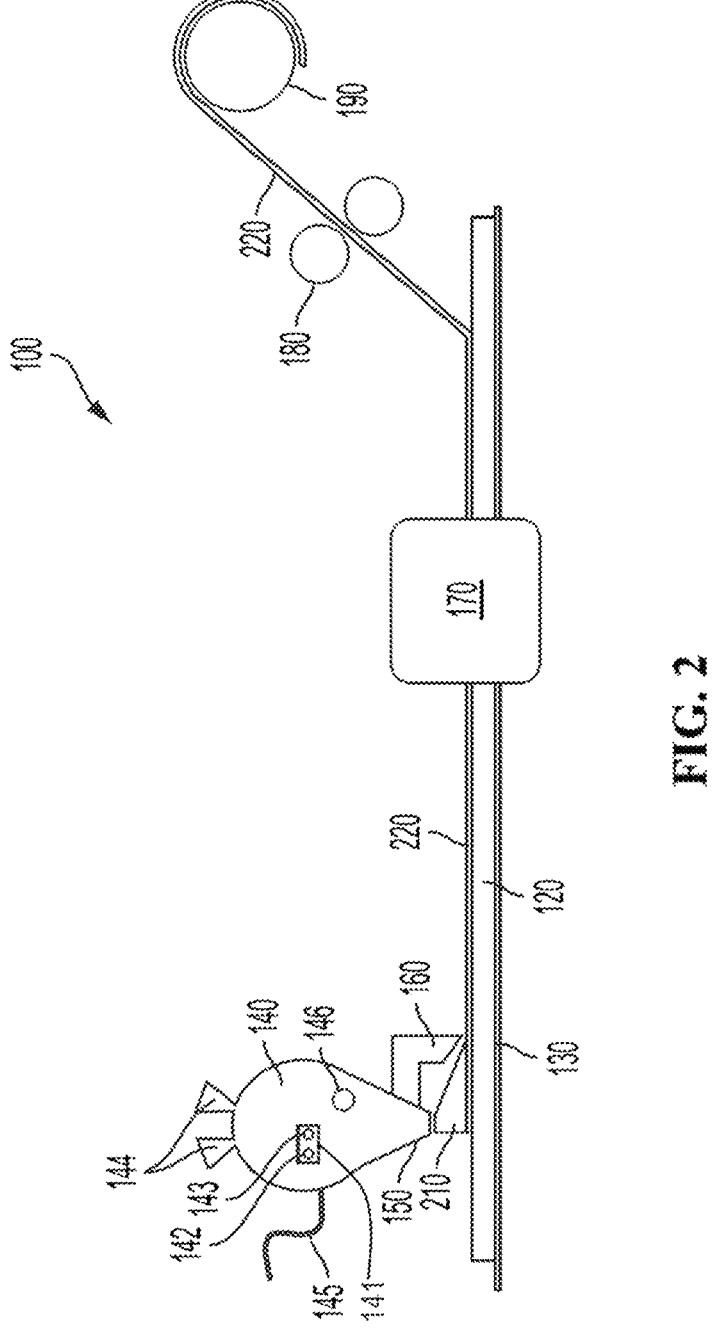
FIG. 2 shows an illustrative diagram of the apparatus and components used in the present disclosure to produce carbon nanotube sheets with additional components for drying, pressing, and rolling, according to an embodiment of the present disclosure.

FIG. 1 shows an illustrative diagram of the system used in the present disclosure to produce carbon nanotube sheets 220, wherein a slurry of carbon nanotubes is contained within a reservoir to be dispensed onto a substrate, with a doctoring member to level out the resulting deposited carbon nanotube slurry, according to an embodiment of the present disclosure. The overall system 100 includes a slurry of carbon nanotubes 210, which is contained within a reservoir 140. A dispenser 150 is connected to the reservoir 140 and is used to dispense the slurry of carbon nanotubes onto a substrate 120. A doctoring member 160 is optionally connected to the reservoir 140, or may be separate therefrom. A conveyor 130 may move the substrate 120 to allow continuous dispersion of slurry 210. The reservoir may include a mixing and homogenizing device 141, which may include a mixing device 142 and/or a homogenizing device 143, reservoir inlets 144, vacuum lines 145, and a degassing device 146. As shown in FIG. 2, the system 100 may also include a dryer 170, a press 180, and a roll 190.

The dispenser 150 is configured to dispense the slurry onto the surface of the substrate 120. The dispenser 150 may be a standard dispenser or a spray dispenser. In some embodiments, the substrate 120 may be placed on a conveyor 130 and may be moveable with the conveyor 130, so as to allow continuous dispensing of the slurry 210, as shown in FIG. 2. In some embodiments, the substrate 120 may be on a conveyor belt.

The slurry of carbon nanotubes 210 may include carbon nanotube material, which may include carbon nanotube powder, carbon nanotube flakes, carbon nanotube pellets, or combinations thereof. The slurry 210 may also include functional materials such as surfactants, emulsifying agents, binders, metals, metal oxides, metal alloys, and/or carbonaceous material. The functional materials may be organic and/or inorganic functional materials. Example metals include, but are not limited to, copper, aluminum, iron, cobalt, nickel, zinc, vanadium, chromium, titanium, manganese, silver, platinum, gold, tantalum, tungsten, palladium, lead, antimony, tin, and/or gallium. Example metal oxides include, but are not limited to, $SiO_2$, $HfO_2$, $Fe_2O_3$, $Fe_3O_4$, $V_2O_5$, $TiO_2$, $WO_2$, $VO_2$, $ZrO_2$, $Al_2O_3$, $Cr_2O_3$, $Er_2O_3$, $Ni_2O_3$, $W_2O_3$, $V_2O_3$, $VO$, $ZnO$, $NiO$, $CaO$, $FeO$, $RuO_2$, $MnO_2$, $Co_3O_4$, $SnO_2$, and/or $In_2O_3$. Example metal alloys include, but are not limited to, stainless-steel, bronze, brass, alnico, nichrome, ferroalloys (e.g., ferrochromium, ferromanganese, ferromolybdenum, ferronickel, ferrosilicon, ferrotitanium, ferrotungsten, ferrovanadium), fernico, kanthal, and/or alumel. Example carbonaceous materials include, but are not limited to, graphite, and/or graphene.

The slurry 210 may include carbon nanotubes dispersed in a solvent. In some embodiments, the solvent may include water and/or an alcohol (e.g., methanol and/or ethanol), and/or an organic fluid (e.g., acetone, dimethylformamide, tetrahydrofuran, dimethylacetamide, and/or dimethyl sulfoxide). In some embodiments, the solvent may include water and the alcohol and/or organic fluid in a ratio by weight in a range of about 75:25 or about 0:100. For example, the solvent may include water and ethanol in a ratio by weight of about 75:25 to about 0:100 or the solvent may include water and acetone in a ratio by weight of about 75:25 to about 0:100. In some embodiments, the solvent may include water and ethanol or acetone in a ratio of about 10:1, for example water and acetone in a ratio of about 10:1, water and ethanol in a ratio of about 10:1, or water and a combination of acetone and ethanol in a ratio of about 10:1. In some embodiments, the solvent may include water and ethanol or acetone in a ratio of about 100:1, for example water and acetone in a ratio of about 100:1, water and ethanol in a ratio of about 100:1, or water and a combination of acetone and ethanol in a ratio of about 100:1.

In some embodiments, the carbon nanotube slurry 210 may include a surfactant or dispersion agent. The surfactant or dispersion agent may include polyethylene glycol (PEG), sodium lauryl sulfate, sodium dodecylbenzenesulfonate (SDBS), Triton X-100 (($C_{14}H_{22}O(C_2H_4O)_n$)), sodium alginate, or combinations thereof.

There is a doctoring member 160 which is optionally connected to the reservoir 140 and dispenser 150, or the doctoring member 160 may be unattached to the dispenser. FIG. 1 shows the doctoring member 160 is attached, but other embodiments of the present disclosure may include an unattached doctoring member. The purpose of the doctoring member 160 is to level the dispensed carbon nanotubes to form a carbon nanotube sheet 220 which is uniform in thickness. In some embodiments, the doctoring member 160 is a doctor blade. As will be understood by those skilled in the art, the material of the doctoring member 160 is not particularly limited; the doctoring member 160 may be a metal or alloy such as steel, a polymer, a ceramic material, or other material. In some embodiments, the doctoring member 160 may include a straight, beveled, or lamella tip. The size and dimensions of the doctoring member 160 are not particularly limited and doctoring members of different sizes and dimensions may be employed in the method of the present disclosure in order to suit the needs of a user of the method. The doctoring member 160 may be perpendicular to the plane of the substrate 120, or the doctoring member 160 may form an acute angle with the plane of the substrate. The doctoring member 160 may be spaced apart from the surface of the substrate by a predetermined distance. For example, the doctoring member 160 and the substrate 120 may be separated by a distance of about 0.01 mm to about 10,000 mm, about mm to about 1,000 mm, about 0.01 to about 100 mm, about 0.01 mm to about 10 mm, about mm to about 1 mm, about 1 mm to about 10 mm, about 1 mm to about 100 mm, about 10 mm to about 100 mm, about 10 mm to about 10,000 mm, or any range formed from any combination of the foregoing values.

The slurry reservoir 140, as shown in FIG. 1, may include a mixing/homogenizing device 141, which may include a mixing device 142 or a homogenizing device 143. The mixing device 142 may include a mixing member, sonicator, agitator, and/or a shaker. In some embodiments, the mixing device 142 and the homogenizing device 143 may be configured to operate simultaneously or individually. In some embodiments, the reservoir 140 and/or the mixing/homogenizing device 141 may be connected to vacuum lines 145 for degassing of the slurry.

Degassing of the slurry 210 may at least partially remove bubbles in the slurry. The degassing device 146 may include vacuum generators. In some embodiments, the degassing device 146 may be inside the slurry reservoir 140 and/or the mixing/homogenizing device 141 and may be connected to external vacuum lines 145. For example, degassing of the slurry may be carried out under pressure less than 0.01 mbar using external vacuum generators connected to the external vacuum lines or the degassing devices. Degassing of the slurry may be carried out for about 1 second to about 1 minute, 1 second to about 1 hour, or any range contained therein, at a temperature at or above room temperature. In some embodiments, the mixing/homogenizing device 141 may be connected to external vacuum lines 145 and/or may include the degassing device 146. Degassing of the slurry may be carried out after mixing and sonication are completed. In some embodiments, degassing of the slurry may be carried out simultaneously with mixing and sonication.

In some embodiments, the tape-casting apparatus may also include a dryer 170 and/or a press 180, as shown in FIG. 2. FIG. 2 shows an illustrative diagram of the method to produce carbon nanotube sheets with additional components for drying, pressing, and rolling, according to an embodiment of the present disclosure. The dryer 170 may include a heating element and may include a pressure dryer, an ambient pressure dryer, and/or a vacuum dryer. The dryer 170 may be configured to operate at a temperature greater than or equal to room temperature under a pressure (that is, a pressure greater than or equal to 1 atm) or under vacuum (that is, evacuation to a pressure of less than 0.01 mbar) for about 5 seconds or more (that is, about 10 minutes). A drying process may be performed using batch drying and/or conveyor drying. The dryer 170 may be configured to heat the substrate 120 and/or the carbon nanotube sheet 220 for a set period of time. For example, the substrate and/or carbon nanotube sheet may be heated to a temperature of about 60° C., about 65° C., about 70° C., about 75° C., about 80° C., about 85° C., about 90° C., about 95° C., about 100° C., about 105° C., about 110° C., about 115° C., about 120° C., or any temperature within the range of about 60° C. to about 120° C., or any range formed from any combination of the foregoing values. In some embodiments, the dryer 170 may be configured to heat the substrate and/or carbon nanotube sheet to a temperature of about 60° C. to about 120° C., or any temperature within this range. In some embodiments, the substrate 120 and/or carbon nanotube sheet 220 may be heated for a time of about 12 hours, about 13 hours, about 14 hours, about 15 hours, about 16 hours, about 17 hours, about 18 hours, about 19 hours, about 20 hours, or any time within the range of about 12 hours to about 20 hours. The press 180 may be configured to operate at a temperature greater than or equal to room temperature under a pressure (e.g., a pressure than or equal to 1 Pa) for about 5 seconds or more (e.g., about 10 minutes). In some embodiments, the press 180 may be configured to apply a pressure (e.g., a pressure greater than or equal to about 1 Pa) for about 5 seconds or more (e.g., about 10 minutes).

In some embodiments, the dryer 170 may be a drying/pressing device, and the press 180 may be omitted. The drying/pressing device may be configured to apply both heat and pressure and may be configured to operate at a temperature greater than or equal to room temperature under a pressure (that is, a pressure greater than or equal to 1 atm) or under vacuum (that is, evacuation to a pressure of less than 0.01 mbar) for about 5 seconds or more (that is, about 10 minutes). The tape-casting apparatus may further include a roll 190 that may be configured to roll carbon nanotube sheets 220 to form a rolled carbon nanotube sheet.

In some embodiments, the dryer 170 may include a cooling apparatus which may be used to cool the substrate 120 and/or carbon nanotube sheets 220 after they have been dried and/or heated. In some embodiments, the conveyor 130 may move the substrate 120 and/or carbon nanotube sheets 220 through the dryer 170. In some embodiments, the substrate 120 and/or carbon nanotube sheets 220 may be heated in the dryer 170 by turning on the heating element of the dryer and then the substrate 120 and/or carbon nanotube sheets 220 may be allowed to cool to room temperature inside the dryer 170 by turning the heating element off. In some embodiments, the substrate 120 and/or carbon nanotube sheets 220 may heated in the dryer 170 and then cooled outside of the dryer 170.

In some embodiments, the substrate 120 may include a flexible or rigid metal, a metal alloy or metal oxide, a polymeric material, a glass, a glass-laminated polymer, a semiconductor, an insulator, or combinations thereof. In some embodiments, the substrate may have a predetermined shape, such as a round shape, a rectangular shape, a U-shape, a perforated square shape, a tube shape, a mesh shape, or an I-shape. The carbon nanotube sheets produced by the method of the present disclosure may have a shape that is the same as the shape of the substrate. In some embodiments, there may be multiple substrates which may have the same shapes or be of different shapes. In some embodiments, the surface of the substrate may include a patterned or textured surface (e.g., a hammered, slotted, and/or perforated surface) or a non-patterned surface. In some embodiments, the surface of the substrate may include a microscopic patterned surface (e.g., a micro-pyramid structured surface, a micro-pillar structured surface) or a microscopic non-patterned surface (e.g., a smooth and/or polished surface).

The size of the substrate 120 is not particularly limited. In some embodiments, the substrate may be at least about 0.1 m in length. In some embodiments, the substrate may be at least about 1 m in length. The substrate may have square, rectangular, circular, or other dimensions. In some embodiments, the method of the present disclosure may be used in roll-to-roll printing or screen printing. In some embodiments, the substrate may be at least about 10 m in length, at least about 20 m, at least about 30 m in length, at least about 40 m in length, at least about 50 m in length, at least about 60 m in length, at least about 70 m in length, at least about 80 m in length, at least about 90 m in length, at least about 100 m in length, or any length within the range of at least about 0.1 m in length to at least about 100 m in length, any range formed from any combination of the foregoing values.

FIG. 3 is a flow chart of an exemplary method 300 for making carbon nanotube sheets, according to embodiments of the present disclosure. In some embodiments, the method can include steps of: providing a slurry of a carbon nanotube material dispersed in a solvent and contained in a reservoir 302, dispensing the slurry of the carbon nanotube material onto a substrate with a dispenser which is connected to the reservoir to form a dispensed slurry 304, leveling the dispensed slurry with a doctoring member to form a coated substrate 306, heating the coated substrate for a time of about 12 hours to about 16 hours at a temperature of about 60° C. to about 120° C. 308, and cooling the coated substrate to form a carbon nanotube sheet 310.

The step of providing 302 of the disclosed method can include providing a slurry of a carbon nanotube material dispersed in a solvent and contained in a reservoir. In some embodiments, the carbon nanotube material may include carbon nanotube powder, carbon nanotube flakes, carbon nanotube pellets, or combinations thereof. The carbon nanotube material may include single-walled carbon nanotubes and/or multi-walled carbon nanotubes. In some embodiments, the slurry may include about 0.01 wt. % to about 1 wt. % carbon nanotube material, or the slurry may include about 0.2 wt. % to about 0.7 wt. % carbon nanotube material. For example, the slurry may include about 0.01 wt. %, about 0.02 wt. %, about 0.03 wt. %, about 0.04 wt. %, about 0.05 wt. %, about 0.06 wt. %, about 0.07 wt. %, about 0.08 wt. %, about 0.09 wt. %, about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1.0 wt. %, or any value contained within the range of about 0.1 wt. % to about 1 wt. %, or any range formed from any combination of the foregoing values. As used herein, the weight percentage of carbon nanotube material is relative to the total weight of the slurry.

In some embodiments of the present disclosure, the solvent may include water, ethanol, acetone, dimethylformamide, tetrahydrofuran, dimethylacetamide, dimethyl sulfoxide, or combinations thereof. In some embodiments, the solvent may include water and acetone in a ratio of about 10:1 to about 100:1. In some embodiments, the solvent may include water and ethanol in a ratio of about 10:1 to about 100:1. In some embodiments, the solvent may include water and a mix of ethanol and acetone in a ratio of about 10:1 to about 100:1. The carbon nanotubes may be dispersed in the solvent by mixing, stirring, homogenizing, or otherwise combining.

The step of dispensing 304 of the disclosed method may include dispensing the slurry of the carbon nanotube material onto a substrate with a dispenser which is connected to the reservoir to form a dispensed slurry. The dispenser may be a spray dispenser or standard dispenser. In some embodiments, the substrate may include a flexible or rigid metal, a metal alloy or metal oxide, a polymeric material, a glass, a glass-laminated polymer, or combinations thereof. In some embodiments, the substrate is at least about 0.1 m in length, or the substrate is at least about 1 m in length. The shape and size of the substrate is not particularly limited, and the substrate may have rectangular, circular, or other dimensions. The substrate may be patterned or smooth, according to some embodiments.

The step of leveling 306 of the disclosed method can include leveling the dispensed slurry with a doctoring member to form a coated substrate. In some embodiments, the doctoring member may be a doctor blade. The material of the doctoring member is not particularly limited; the doctoring member may be a metal or alloy such as steel, a polymer, a ceramic material, or other material. In some embodiments, the doctoring member may include a straight, beveled, or lamella tip. The size and dimensions of the doctoring member are not particularly limited and doctoring members of different sizes and dimensions may be employed in the disclosed method to correspond to the size, material, or patterning of the substrate or other variables, according to some embodiments of the present disclosure. In some embodiments, the doctoring member is separated from the substrate by a distance of about 0.01 mm to about 2 mm, such as about 0.01 mm, about mm, about 0.03 mm, about 0.04 mm, about 0.05 mm, about 0.06 mm, about 0.07 mm, about mm, about 0.09 mm, about 0.1 mm, about 0.2 mm, about 0.3 mm, about 0.4 mm, about mm, about 0.6 mm, about 0.7 mm, about 0.8 mm, about 0.9 mm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, about 2.0 mm, or any value contained within a range formed by any of the foregoing values. In some embodiments, the doctoring member is separated from the substrate by a distance of about 0.1 mm to about 0.7 mm.

The step of heating 308 of the disclosed method may include heating the coated substrate for a time of about 12 hours to about 16 hours at a temperature of about 60° C. to about 120° C., for example about 60° C., about 70° C., about 80° C., about 90° C., about 100° C., about 110° C., about 120° C., or any temperature that is contained within the range of about 60° C. to about 120° C. or any range formed from any combination of the foregoing values. In some embodiments, the time is about 13 hours to about 15 hours. In some embodiments, the time is about 14 hours. In some embodiments, the temperature is about 80° C. to about 100° C. In some embodiments, the temperature is about 90° C. The step of heating 308 may occur in an oven, a dryer, or other device that is configured to generate heat and regulate temperature.

The step of cooling 310 of the disclosed method can include cooling the coated substrate to form a carbon nanotube sheet. In some embodiments, the cooling occurs in the same oven, dryer, or other device in which heating occurred, and in some embodiments the step of cooling may occur outside such a device. The coated substrate is considered cooled when it reaches room temperature, according to some embodiments of the present disclosure. The step of cooling 310 may be performed by removing a heat source, such that the coated substrate is no longer being heated, or cooling may be performed by introducing a cooling source such as cold air, a freezer, or other cooling methods.

In some embodiments of the disclosed method, the carbon nanotube sheet remains on the substrate after the step of cooling 310. In some embodiments, the method further includes the step of removing the carbon nanotube sheet from the substrate to form a freestanding carbon nanotube sheet. In some embodiments, the method further includes the step of removing the carbon nanotube sheet from the substrate and rolling the carbon nanotube sheet to form a rolled carbon nanotube sheet.

Figure 4A:
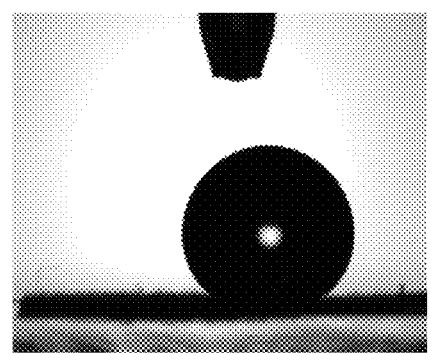
FIGS. 4A-4C depict the contact angle of water droplets on the surface of carbon nanotube sheets, demonstrating that the carbon nanotube sheets are superhydrophobic.
Figure 4B:
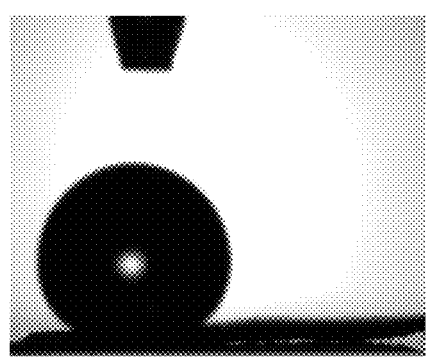
Figure 4C:
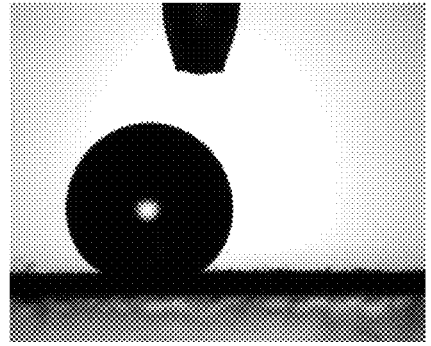

In some embodiments, the carbon nanotube sheets produced by the disclosed method are superhydrophobic. Superhydrophobicity is commonly defined in the art as a surface on which a water droplet will have a contact angle greater than about 150°. FIGS. 4A-4C depict the contact angle of water droplets on the surface of carbon nanotube sheets, demonstrating that the carbon nanotube sheets are superhydrophobic. FIG. 4A shows a carbon nanotube sheet on a glass substrate with a copper and silicon border, wherein the water droplet has a contact angle of 157.39°. FIG. 4B shows a carbon nanotube sheet on copper with a 5 mm gap on a glass substrate, wherein the water droplet has a contact angle of 156.67°. FIG. 4C shows a carbon nanotube sheet on glass substrate with a copper and silicon border, wherein the water droplet has a contact angle of 155.54°.

Figure 5:
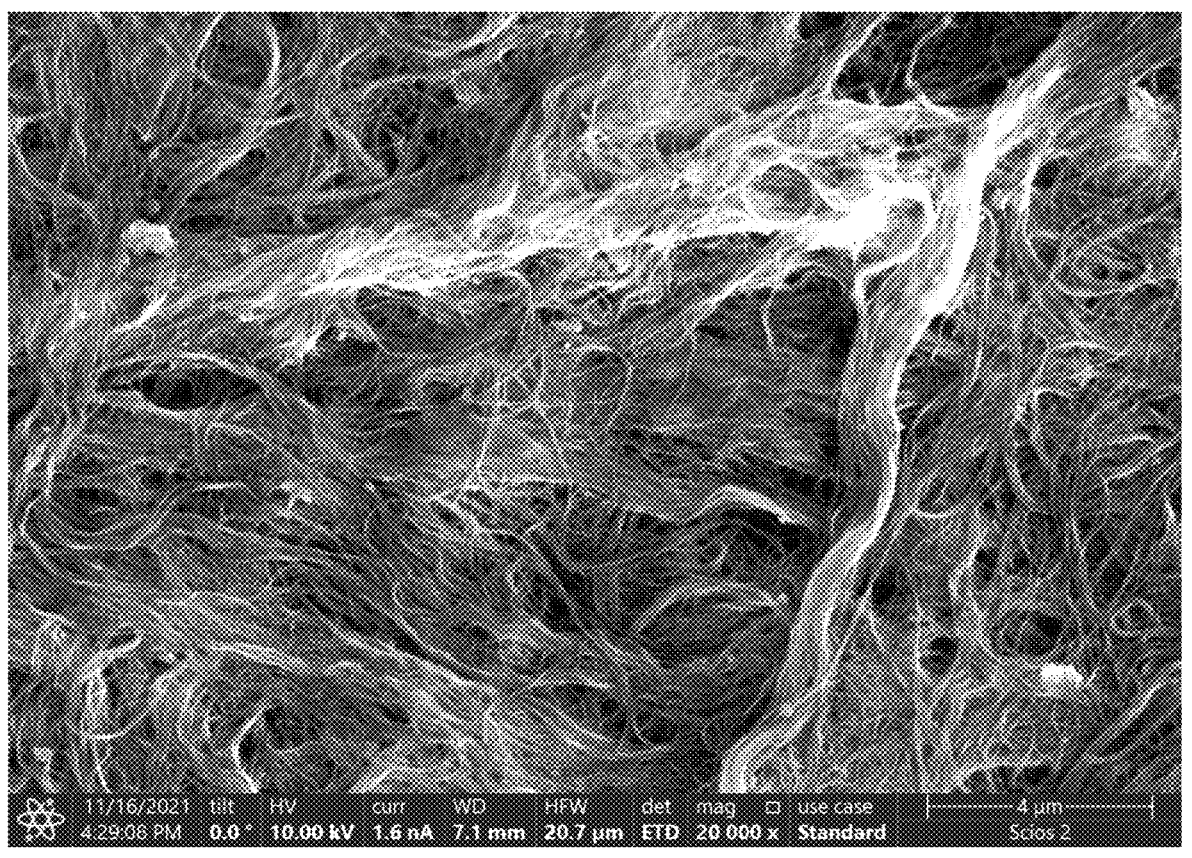
FIG. 5 shows scanning electron microscopy (SEM) of a carbon nanotube sheet produced by the method of the present disclosure, showing the extended fiber network in detail.
Figure 6:
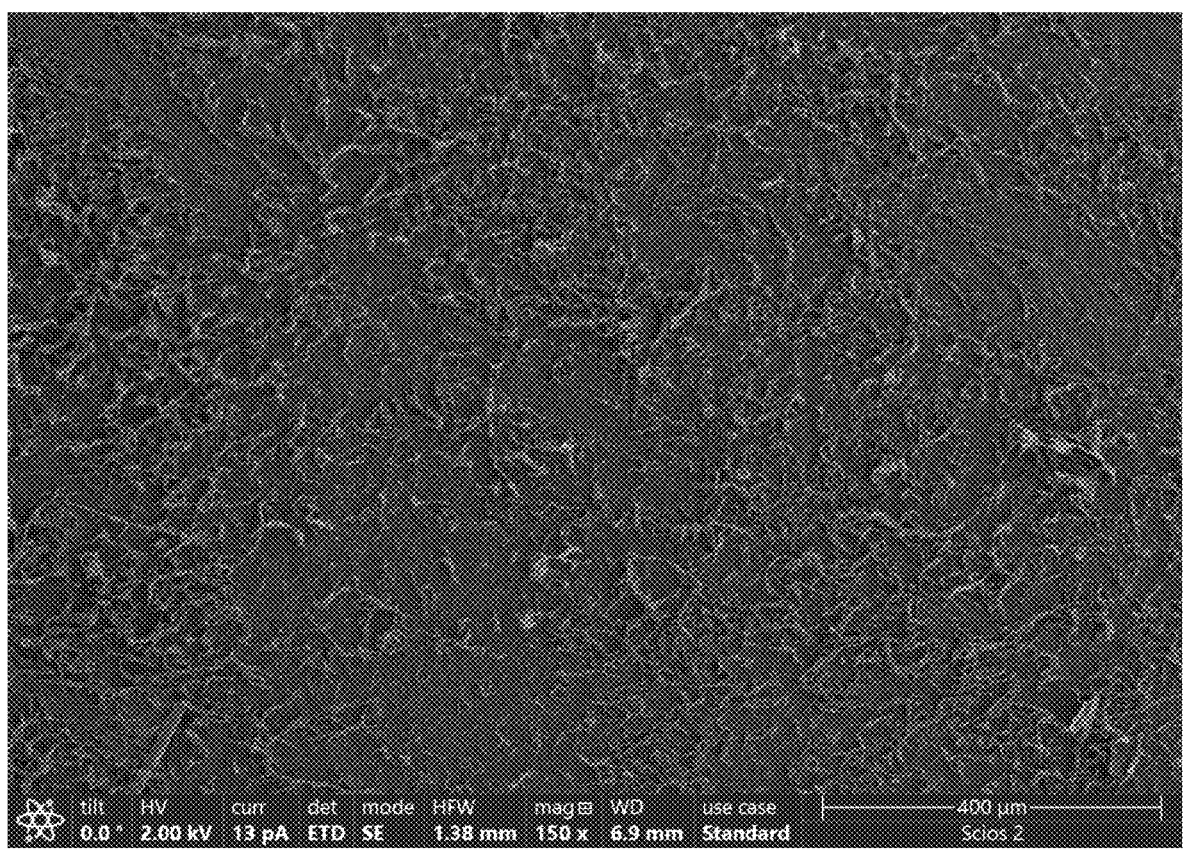
FIG. 6 shows scanning electron microscopy (SEM) of a carbon nanotube sheet produced by the method of the present disclosure.
Figure 7:
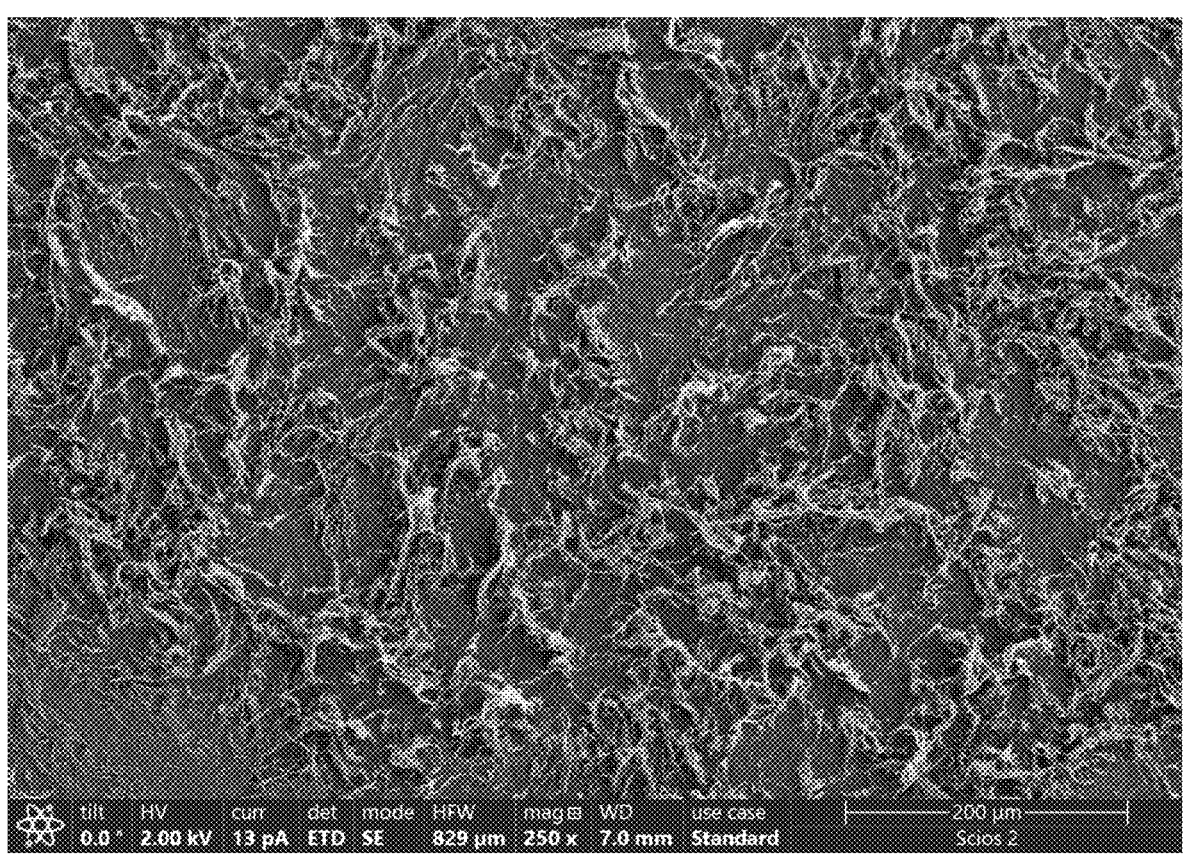
FIG. 7 shows scanning electron microscopy (SEM) of a carbon nanotube sheet produced by the method of the present disclosure at increased magnification.
Figure 8:
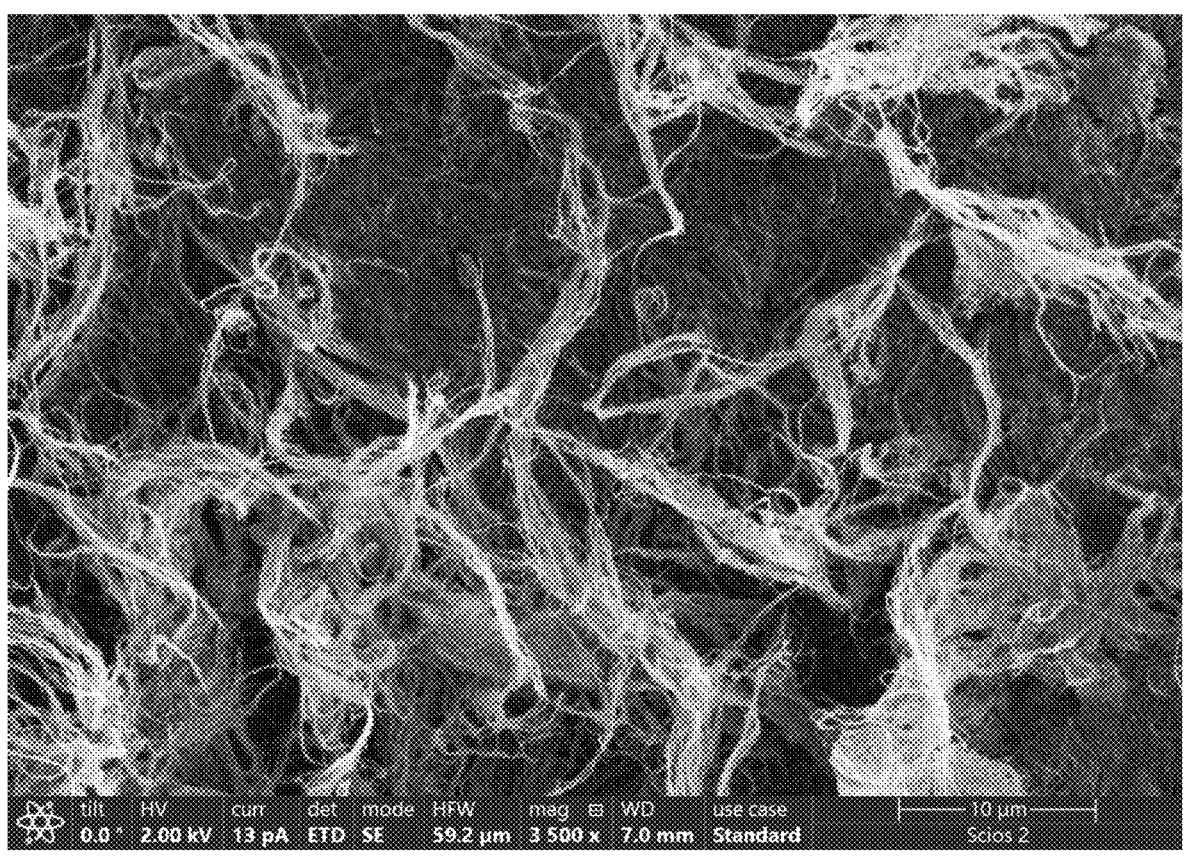
FIG. 8 shows scanning electron microscopy (SEM) of a carbon nanotube sheet produced by the method of the present disclosure at increased magnification.
Figure 9:
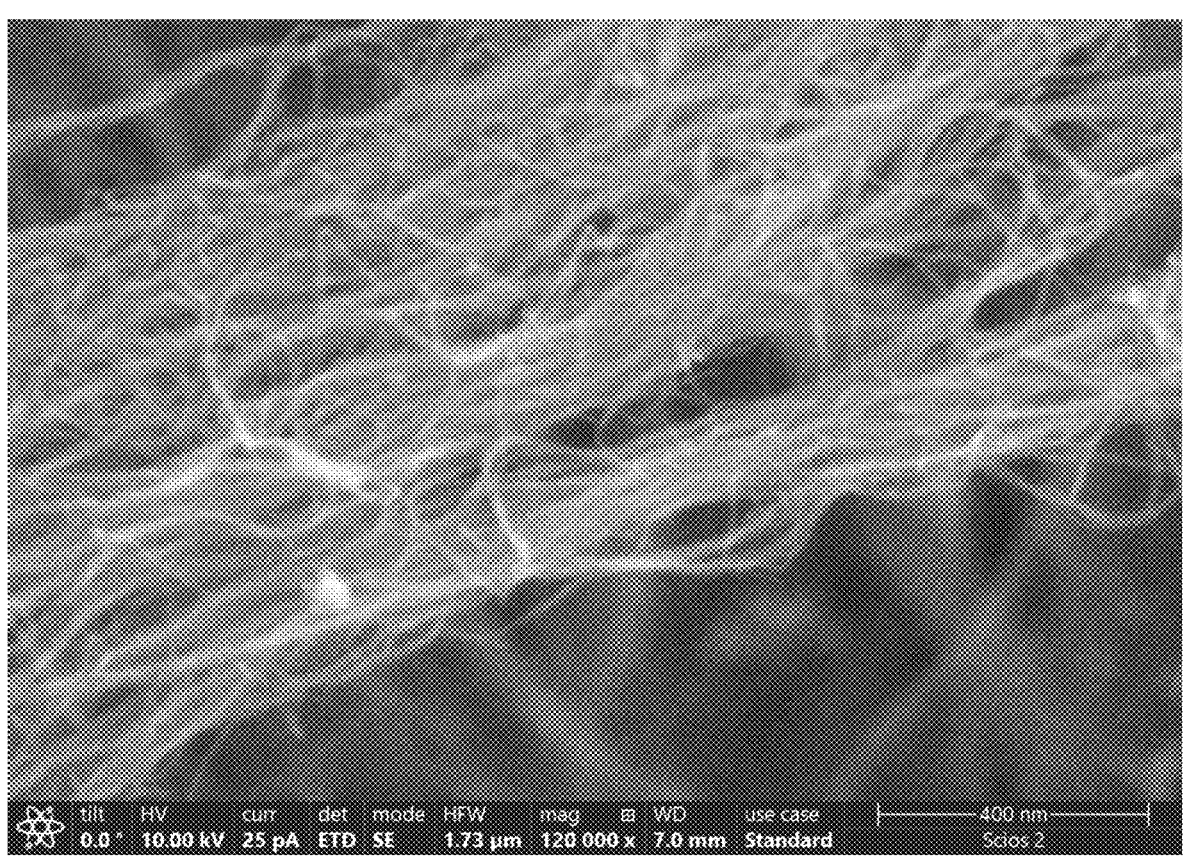
FIG. 9 shows scanning electron microscopy (SEM) of a carbon nanotube sheet produced by the method of the present disclosure at increased magnification.

In some embodiments, the carbon nanotube sheets produced by the method of the present disclosure may be characterized by techniques such as scanning electron microscopy (SEM), X-ray photoelectron spectroscopy (XPS), Fourier-transform infrared (FTIR) spectroscopy, and other imaging techniques known to those skilled in the art. FIG. 5 shows an SEM image of a carbon nanotube sheet produced by the method of the present disclosure, showing the extended fiber network in detail.

FIG. 6, FIG. 7, FIG. 8, and FIG. 9 each show SEM images of a carbon nanotube sheet produced by the method of the present disclosure at increasing magnification. The features captured at different magnifications that are visible in FIGS. 6-9 are include aggregated and quasi-vertically-oriented carbon nanotubes (QVOCNTs). Typically, these features are achievable only by chemical vapor deposition (CVD), which is expensive and time-consuming. However, the method of the present disclosure has been found to also be capable of producing QVOCNTs, with the added benefit of lowered cost and time relative to CVD. The QVOCNTs undergo arrangement in hierarchical mesostructured surfaces which, coupled with the intrinsic nature of the CNTs themselves, result in surface energies in the superhydrophobic regime. Without wishing to be bound by theory, it is contemplated that such surfaces most likely fall within the Cassie-Baxter or transition Wenzel to Cassie-Baxter models.

This disclosure describes a method of producing carbon nanotube sheets that are superhydrophobic and may be optionally removed from the substrate on which they are fabricated to provide a freestanding carbon nanotube sheet.

EXAMPLES

Example 1

Multiwalled, technical grade carbon nanotube flakes were suspended in water with about 1% to about 10% technical grade ethanol and mixed by sonication to ensure even dispersion of the carbon nanotubes, forming a slurry of carbon nanotubes. The content of carbon nanotubes in the slurry ranged from about 0.35 wt. % to about 0.55 wt. %. The slurry of carbon nanotubes was contained in a reservoir to be casted onto a substrate using a tape-casting method. In this method, the slurry was deposited onto the substrate from a dispenser attached to the reservoir to form a layer of about 6 mm thickness. A doctoring member (standard steel doctor blade) followed behind the dispenser to smooth out the slurry of carbon nanotubes which was deposited. Substrates used in the present method include copper, glass, aluminum, and PTFE. The carbon nanotube-coated substrate was then heated in an oven for 14 hours at 90° C., after which the coated substrate was cooled in the oven until it reaches room temperature. The resulting carbon nanotube sheet was about 30 µm to about 50 µm in thickness. The carbon nanotube sheets that are produced by this method can remain on the substrate, be removed from the substrate to yield freestanding carbon nanotube sheets, or be removed from the substrate and rolled to form a rolled carbon nanotube sheet. In some instances of the present example, the carbon nanotube sheet was peeled from the substrate. In other instances, a few drops of water were used to lift the carbon nanotube sheet from the substrate.

This disclosure is not limited to the particular systems, devices and methods described, as these may vary. The terminology used in the description is for the purpose of describing the particular versions or embodiments only and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof.

Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 compounds refers to groups having 1, 2, or 3 compounds. Similarly, a group having 1-5 cells refers to groups having 1, 2, 3, 4, or 5 compounds, and so forth.

Various of the above-disclosed and other features and functions, or alternatives thereof, may be combined into many other different systems or applications. Various presently unforeseen or unanticipated alternatives, modifications, variations, or improvements therein may be subsequently made by those skilled in the art, each of which is also intended to be encompassed by the disclosed embodiments.

What is claimed is:

1. A method for producing superhydrophobic carbon nanotube sheets, the method comprising steps of:

providing a slurry of a carbon nanotube material dispersed in a solvent and contained in a reservoir, wherein the slurry comprises 0.2 wt. % to 0.7 wt. % carbon nanotube material and wherein the solvent comprises water and acetone in a ratio of 10:1 to 100:1, water and ethanol in a ratio of 10:1 to 100:1, or water and a mix of ethanol and acetone in a ratio of 10:1 to 100:1, dispensing the slurry of the carbon nanotube material onto a substrate with a dispenser which is connected to the reservoir to form a dispensed slurry, leveling the dispensed slurry with a doctoring member to form a coated substrate, heating the coated substrate for a time of 14 hours at a temperature of 90° C., and cooling the coated substrate to form a carbon nanotube sheet.

2. The method of claim 1, wherein the carbon nanotube material comprises carbon nanotube powder, carbon nanotube flakes, carbon nanotube pellets, or combinations thereof.

3. The method of claim 1, wherein the solvent comprises water and acetone in a ratio of 10:1 to 100:1.

4. The method of claim 1, wherein the solvent comprises water and ethanol in a ratio of 10:1 to 100:1.

5. The method of claim 1, wherein the solvent comprises water and a mix of ethanol and acetone in a ratio of 10:1 to 100:1.

6. The method of claim 1, wherein the doctoring member is separated from the substrate by a distance of 0.01 mm to 2 mm.

7. The method of claim 1, wherein the doctoring member is separated from the substrate by a distance of 0.1 mm to 0.7 mm.

8. The method of claim 1, wherein the substrate comprises a flexible or rigid metal, a metal alloy or metal oxide, a polymeric material, a glass, a glass-laminated polymer, or combinations thereof.

9. The method of claim 1, wherein the substrate is at least 0.1 m in length.

10. The method of claim 1, wherein the substrate is at least 1 m in length.

11. The method of claim 1, wherein the carbon nanotube sheet remains on the substrate.

12. The method of claim 1, further comprising the step of removing the carbon nanotube sheet from the substrate to form a freestanding carbon nanotube sheet.

13. The method of claim 1, further comprising the step of removing the carbon nanotube sheet from the substrate and rolling the carbon nanotube sheet to form a rolled carbon nanotube sheet.

* * * * *